United States Patent Office 2,737,202
Patented Mar. 6, 1956

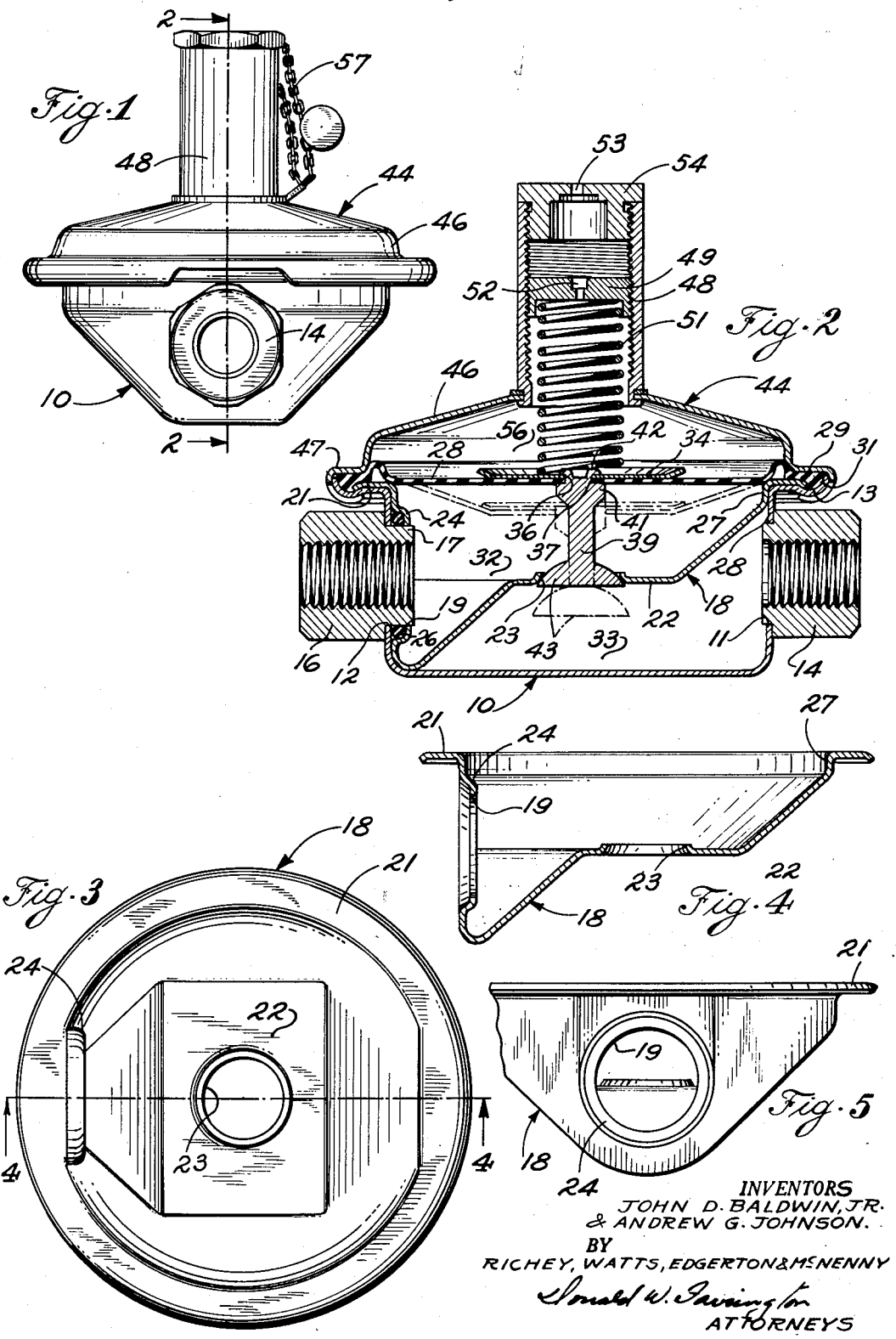

2,737,202

APPLIANCE REGULATOR

John D. Baldwin, Jr., and Andrew G. Johnson, Cleveland, Ohio, assignors to The Weatherhead Company, Cleveland, Ohio, a corporation of Ohio Application May 4, 1954, Serial No. 427,639

6 Claims. (Cl. 137—505.41)

This invention relates generally to pressure regulators for supplying low pressure fluid from a high pressure source and more particularly to an improved apparatus and method of assembly for a pressure regulator for a type disclosed in the co-pending application, Serial No. 317,532, filed October 29, 1952.

With the increase in use of liquified petroleum gas for domestic installations, it has become desirable to provide a low cost pressure regulator which provides adequate pressure characteristics and flow regulations along with dependable operation and substantially no maintenance. In the above mentioned co-pending application, a pressure regulator is shown which may be manufactured by a low cost high production manufacturing process. This invention is related to an improved device for further reducing the manufacturing and assembly cost of the regulator without sacrificing any of the desirable attributes such as accuracy of pressure regulations, capacity of flow and dependability of use.

It is an important object of this invention to provide a pressure regulator capable of accurately regulating outlet pressure over large ranges of volumes which regulator is dependable in operation and simple and economical to produce.

It is another object of this invention to provide a pressure regulator wherein low cost high production methods of manufacture and assembly may be incorporated so as to reduce the unit cost of the regulator as much as possible.

It is still another object of this invention to provide a pressure regulator wherein a long relatively trouble-free service life is insured without necessitating high manufacturing cost.

Further objects and advantages will appear from the following description and drawings, wherein:

Fig. 1 is an end elevation showing the general shape characteristic of a pressure regulator according to this invention;

Fig. 2 is a side elevation and cross section taken along 2—2 of Fig. 1 showing the structural arrangement of an assembled regulator according to this invention;

Fig. 3 is a plan view of the partition plate of a regulator according to this invention;

Fig. 4 is a cross section taken along 4—4 of Fig. 3 showing the partition plate; and Fig. 5 is an end elevation showing the general shape of the partition shown in Fig. 3.

For a clear understanding of this invention reference should be made to the drawings wherein a preferred form of the pressure regulator according to this invention is disclosed. The pressure regulator comprises a body stamping 10 formed with an inlet aperture 11, an outlet aperture 12, and a peripheral flange 13. An inlet fitting 14 is positioned in the inlet aperture 11 and an outlet fitting 16 is positioned in the outlet aperture 12. These two fittings are preferably brazed in place by hydrogen brazing so as to provide a fluid seal between the elements and a high degree of mechanical strength. The fittings 14 and 16 may be provided with suitable threads for connection to a source of fluid pressure and the system to be supplied. The outlet fitting 16 is formed with a projecting end portion 17 which extends through the outlet aperture 12 into the body 10 by a substantial amount. The purpose of this projecting portion will be explained in detail later.

Situated within the body 10 is a partition plate 18 formed with an outlet aperture 19 of substantially the same diameter as the outlet aperture 12 in the body 10. The partition plate 18 is also provided with a continuous peripheral flange 21 which is adapted to engage the flange 13 on the body 10, but is arranged to terminate radially within the periphery of the flange 13. The lower wall of the partition 18 is formed with an intermediate centrally located horizontal portion 22 with an aperture 23 therein. Adjacent to the outlet aperture 19 of the partition 18 a flared mouth portion 24 is formed which extends into the partition providing, in cooperation with the end portion 17 of the outlet fitting and the wall of the body 10, a packing ring opening. A packing ring 26 is positioned in this opening and provides sealing engagement with the end portion 17, the partition 18 and the body 10. In the preferred embodiment of this invention, this packing ring may be a rubber O-ring or the like. The wall of the partition 18 remote from the outlet opening 19 is formed with a depending portion 27 which engages the side wall 28 of the body 10 thereby preventing any motion of the partition away from the outlet aperture. The proportions of the body of the partition are such that when the partition 18 is positioned in the body 10, the flared mouth 24 will tightly engage packing ring 26 to insure the seal and this wall portion 27 resists any motion of the partition which would tend to break the seal.

A thin flexible diaphragm 28 extends across the upper portion of the partition 18 and the body 10 and is provided with a peripheral bead 29 which fits into the groove 31 formed in the flange 13 and engages the flange 13 of the body 10 and the flange 21 of the partition 18. It is apparent therefore that a fluid seal is provided between the diaphragm and both flanges. An inspection of Fig. 2 will show that the diaphragm 28 and the partition 18 thereby define the low pressure chamber 32 which is in fluid communication with the outlet fitting 16; and the partition 18 and the body 10 define the high pressure chamber 33 which is in fluid communication with the inlet fitting 14.

A diaphragm backing plate 34 is positioned adjacent to the upper side of the diaphragm 28 and is formed with a central aperture 36 which is adjacent to the central aperture 37 in the diaphragm 28. These apertures provide the means for mounting the valve member 39 which is formed with an enlarged shoulder 41 positioned against the lower side of the diaphragm adjacent to the aperture 37 and a flange portion 42 which extends through the apertures and engages the upper surface of the backing plate 34. The lower end of the valve member 39 is formed with an enlarged valve portion 43 which is adapted to engage the partition 18 adjacent to the aperture 23 thereby regulating the flow of fluid from the high pressure chamber 33 into the low pressure chamber 32.

The upper body assembly 44 comprises a cover member 46 formed with a peripheral flange 47 which engages the upper side of the diaphragm bead 29. In order to mount the cover member 46 in position, the flange 47 is deformed around the flange 13 of the body 10 engaging the lower side thereof. The spring retainer 48 is mounted on the cover member 46 and is provided with a spring adjusting member 49 which is adjustably threaded therein. The regulating spring 51 extends between the spring adjusting member 49 and the backing plate 34 and therefore biases the valve member 39 downwardly. Vents 52 and 53 are provided in the spring adjusting member 49 and the cap member 54. The upper body assembly 44, in cooperation with the diaphragm 28, defines the reference chamber 56 which is vented to atmosphere by the vents 52 and 53. To insure that the regulator is not tampered with after calibration, a lock wire 57 may be provided to prevent removal of the cap member 54. In operation, the spring adjusting member 49 is threaded along the spring retainer 48 to provide proper calibration of the spring 51. The spring in turn biases the diaphragm 48 against the pressure on the diaphragm caused by the fluid within the low pressure chamber 32. The diaphragm moves between the position shown in Fig. 2 wherein the valve is closed and the position shown in phantom in Fig. 2 wherein the valve is open in response to variations between the forces on the diaphragm due to the spring and the forces on the diaphragm due to the pressures within the low pressure chamber. It is apparent that when the pressure in the low pressure chamber 32 goes below the desired pressure, the spring 51 will move the diaphragm down thereby opening the valve permitting flow of fluid from the high pressure chamber 33 into the low pressure chamber 32. Conversely, when the fluid pressure within the low pressure chamber reaches the desired calibrated pressure, the diaphragm will move up against the spring causing the valve to close.

Those skilled in the art will realize that the regulators disclosed may be formed by merely stamping the body member 10, the partition 18 and the cover member 46 from sheet stock. The inlet and outlet fittings 14 and 16 and the various other elements of the regulators may also be manufactured by low cost screw machine operations. In the assembly of the completed regulator, the inlet and outlet fittings are first brazed in place, after which the packing ring 26 is positioned around the end portion 17. The partition 18 is then merely inserted into the body. It is apparent that the remaining portion of the assembly automatically provides all necessary seals between the partition 18 and the body 10. It is apparent that the partition is securely positioned in place in the assembled regulator without necessitating mechanical fastening such as brazing and the like with the result that the assembly cost of the completed regulator is substantially reduced.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A pressure regulator comprising a generally cup-shaped casing formed with an inlet aperture, an outlet aperture and an outwardly extending continuous flange at the open end; a generally cup-shaped partition having a valve opening positioned within said casing formed with an outlet aperture co-axial with the outlet aperture of said casing and an outwardly extending continuous flange, a resilient sealing member in sealing engagement with the walls of said casing and partition adjacent to said outlet aperture, a diaphragm in sealing engagement with both of said flanges extending across the opening in said partition, said diaphragm and partition defining a low pressure chamber in fluid communication with said outlet fitting and said casing and partition defining a high pressure chamber in fluid communication with said inlet aperture, and valve means operably connected to said diaphragm controlling the fluid flow through the valve opening from said high pressure chamber to said low pressure chamber.

2. A pressure regulator comprising a generally cup-shaped casing formed with an inlet aperture, an outlet aperture and an outwardly extending continuous flange at the open end; a generally cup-shaped partition having a valve opening positioned within said casing formed with an outlet aperture co-axial with the outlet aperture of said casing and an outwardly extending continuous flange, an outlet fitting extending through said outlet apertures, said partition being formed with a flared mouth extending into said partition adjacent to the outlet aperture therein, said flared mouth in cooperation with said fitting and the walls of the casing adjacent to the outlet aperture therein defining a sealing member chamber, a resilient sealing member positioned in said sealing member chamber in sealing engagement with said fitting and the walls of said casing and partition adjacent to said outlet aperture, a diaphragm in sealing engagement with both of said flanges extending across the opening in said partition, said diaphragm and partition defining a low pressure chamber in fluid communication with said outlet fitting and said casing and partition defining a high pressure chamber in fluid communication with said inlet aperture, and valve means operably connected to said diaphragm controlling the fluid flow through the valve opening from said high pressure chamber to said low pressure chamber.

3. A pressure regulator comprising a generally cup-shaped casing formed with an inlet aperture, an outlet aperture and an outwardly extending continuous flange at the open end; a generally cup-shaped partition having a valve opening positioned within said casing formed with an outlet aperture co-axial with the outlet aperture of said casing and an outwardly extending continuous flange engaging the flange of said casing, an outlet fitting extending through said outlet apertures, said partition being formed with a flared mouth extending into said partition adjacent to the outlet aperture therein, said flared mouth in cooperation with said fitting and the walls of the casing adjacent to the outlet aperture therein defining a sealing member chamber, a resilient sealing member positioned in said sealing member chamber in sealing engagement with said fitting and the walls of said casing and partition adjacent to said outlet aperture, said partition engaging the casing and having a depending portion preventing motion of the partition away from the outlet aperture, a diaphragm in sealing engagement with both of said flanges, said diaphragm and partition defining a low pressure chamber in fluid communication with said outlet fitting and said casing and partition defining a high pressure chamber in fluid communication with said inlet aperture, and valve means operably connected to said diaphragm controlling the fluid flow through the valve opening from said high pressure chamber to said low pressure chamber.

4. A pressure control apparatus comprising a generally cup-shaped casing provided with an inlet aperture and an outlet aperture, a generally cup-shaped partition having a valve opening positioned within said casing and provided with an outlet aperture adjacent the outlet aperture of said casing, and a resilient sealing member positioned in sealing engagement with said casing and partition adjacent to said outlet apertures, said casing and partition being provided with mutually engaging surfaces including a depending portion of said partition thereby preventing movement of said partition away from the outlet aperture.

5. A pressure control apparatus comprising a generally cup-shaped casing provided with an inlet aperture and an outlet aperture, a generally cup-shaped partition having a valve opening positioned within said casing and having an outlet aperture coaxial with the outlet aperture of said casing, a resilient sealing member positioned in sealing engagement between the partition and said casing at said outlet apertures, said partition engaging the casing and having a depending portion thereof preventing motion of the partition away from the outlet aperture.

6. A pressure control apparatus comprising a generally cup-shaped casing formed with an inlet aperture and an outlet aperture, a generally annular cup-shaped partition having a valve opening therein positioned within said casing formed with an outlet aperture coaxial with the outlet aperture of said casing, an outlet fitting extending through said apertures, and a resilient sealing member positioned in sealing engagement with said fitting and the walls of said casing and partition adjacent to said outlet apertures.

References Cited in the file of this patent

UNITED STATES PATENTS

| 1,699,541 | Murray | Jan. 22, 1929 |
| 1,799,025 | Schrader | Mar. 31, 1931 |
| 2,363,943 | Carlson | Nov. 28, 1944 |

FOREIGN PATENTS

| 340,895 | Germany | Sept. 21, 1921 |
| 694,377 | France | Dec. 3, 1930 |
| 517,132 | Great Britain | Jan. 22, 1940 |